United States Patent
Bolz

[11] Patent Number: 6,127,745
[45] Date of Patent: Oct. 3, 2000

[54] DEVICE FOR GUARDING MISPOLARIZATION OF INDUCTIVE LOADS

[75] Inventor: Stephan Bolz, Görisried, Germany

[73] Assignee: Siemens Aktiengesellschaft, Munich, Germany

[21] Appl. No.: 09/250,864

[22] Filed: Feb. 16, 1999

[30] Foreign Application Priority Data

Feb. 16, 1998 [DE] Germany .................. 198 06 311

[51] Int. Cl.$^7$ .................. H01H 47/00; H01H 83/00
[52] U.S. Cl. .................. 307/125; 327/110; 361/84
[58] Field of Search .................. 307/10.7, 125, 307/127, 130, 134; 327/110, 536, 589; 361/58, 77, 84, 86, 90, 91.1, 91.5, 91.6

[56] References Cited

U.S. PATENT DOCUMENTS 4,178,619   12/1979   Seiler et al. .................. 361/91
5,519,557   5/1996    Kopera, Jr. et al. .................. 361/84

FOREIGN PATENT DOCUMENTS

0436778A2   7/1991   European Pat. Off. .

*Primary Examiner*—Stephen W. Jackson
*Assistant Examiner*—A. Henry
*Attorney, Agent, or Firm*—Herbert L. Lerner; Laurence A. Greenberg; Werner H. Stemer

[57] ABSTRACT

A device for switching inductive loads includes a series circuit which is connected between positive and negative poles of voltage source and has a load and a switch associated with the load. A free-running diode is connected parallel to the load. A guard circuit for guarding against mispolarization of the voltage source has an electronic switch connected in series with the free-running diode. The electronic switch is made conducting through a charge pump triggered by an oscillator, given correct polarization of the voltage source.

5 Claims, 1 Drawing Sheet

DEVICE FOR GUARDING MISPOLARIZATION OF INDUCTIVE LOADS

BACKGROUND OF THE INVENTION

Field of the Invention

The invention relates to a device for switching inductive loads, in particular in a motor vehicle, including a series circuit which is located between a positive pole and a negative pole of a voltage source and has a load and a switch associated with the load, a free-running diode connected parallel to the load, and a guard circuit guarding against mispolarization of the voltage source.

A motor vehicle has inductive loads, such as magnet valves, with a current flow which must be controllable linearly (current flow→valve force→hydraulic pressure). As a rule, that is done by clocked switching of a load (such as a load L1 in FIG. 1) with a variable pulse width. Typically, integrated power semiconductors with MOSFET end stages (such as a switch Q1 in FIG. 1), which have a substrate diode that carries current from a source terminal to a drain terminal, are used for switching. A free-running diode (such as a diode D1 in FIG. 1) is connected parallel to the inductive load. As a rule, such a configuration is part of an engine or transmission control system (such as a controller ST outlined in dashed lines in FIG. 1), except for the inductive load itself.

One general problem in motor vehicle electronics is the possibility of mispolarization of the voltage source (such as a voltage source Bat shown in FIG. 1). In that case, the free-running diode and the substrate diode would be connected in the current flow direction to the voltage source, and the resultant current would destroy the free-running diode and the substrate diode. Current flow must therefore be prevented by suitable provisions if the voltage source is mispolarized, but the free-running current for the load must be preserved, and no components that reduce the voltage to be applied to the load can be allowed in the load current circuit.

For that reason, it is attractive to use a simple mispolarization guard diode, which is known per se, or another electronic switch, known from European Patent Application 0 436 778 A2, that becomes nonconductive if the voltage source becomes mispolarized, in the load current circuit.

A version including a main relay having an exciter coil, with a mispolarization guard diode, which is in series with the voltage source and can be excited through the vehicle ignition switch, is generally known. The disadvantages of that version are high cost, large structural volume, limited reliability, and the finite life of the contacts of the main relay.

SUMMARY OF THE INVENTION

It is accordingly an object of the invention to provide a device for switching inductive loads, especially in a motor vehicle, which overcomes the hereinafore-mentioned disadvantages of the heretofore-known devices of this general type, which has a guard circuit to protect against mispolarization of a voltage source, which neither hinders a free-running circuit of the load nor reduces a voltage to be applied to the load, and which overcomes the disadvantages of a main relay.

With the foregoing and other objects in view there is provided, in accordance with the invention, a device for switching inductive loads, in particular in a motor vehicle, comprising a voltage source having a positive pole, a negative pole and a polarization; a series circuit connected between the positive and negative poles of the voltage source, the series circuit including a load and a switch associated with the load; a free-running diode connected parallel to the load; and a guard circuit guarding against mispolarization of the voltage source, the guard circuit having an oscillator, a charge pump, and an electronic switch connected in a series circuit with the free-running diode, the electronic switch made conducting through the charge pump triggered by the oscillator, if the polarization of the voltage source is correct.

In accordance with another feature of the invention, the electronic switch is an inverse-driven n-channel MOSFET having a source terminal connected to the positive pole of the voltage source.

In accordance with a further feature of the invention, the electronic switch has a gate terminal, and the charge pump is connected between the source and gate terminals of the electronic switch.

In accordance with an added feature of the invention, there is provided a voltage supply of the oscillator effected through a load switch from the voltage source by a mispolarization-protected, integrated voltage regulator.

In accordance with a concomitant feature of the invention, there is provided a pulse-proof limiter diode connected parallel to the electronic switch; a connecting line connected from the electronic switch to the free-running diode; and a further pulse-proof limiter diode connected between the connecting line and the negative pole of the voltage source; the free-running diode and the limiter diodes having cathodes connected to one another.

Other features which are considered as characteristic for the invention are set forth in the appended claims.

Although the invention is illustrated and described herein as embodied in a device for switching inductive loads, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
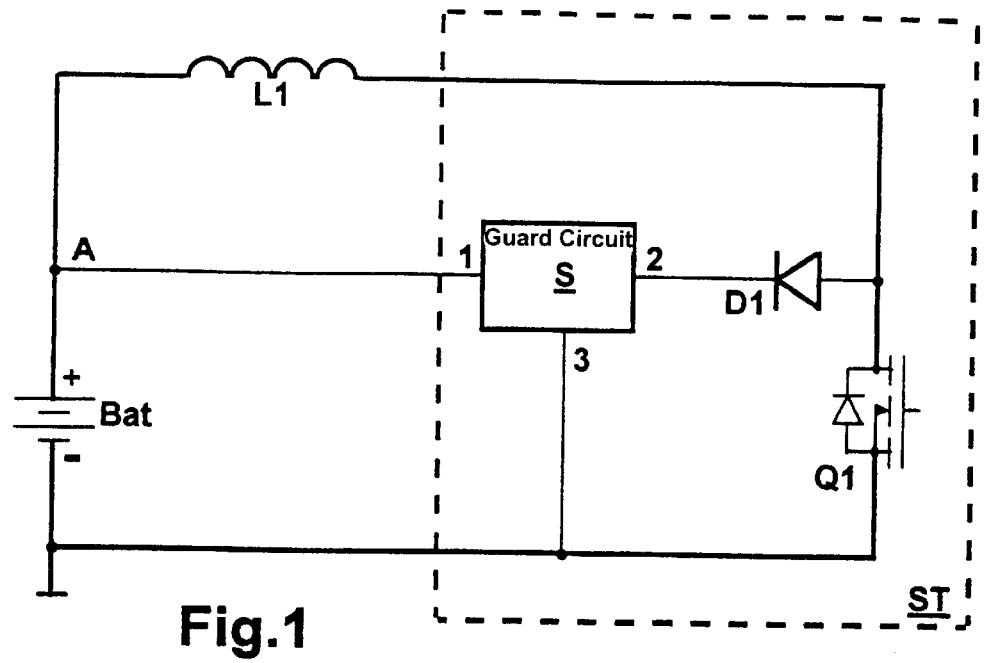
FIG. 1 is a schematic and block circuit diagram of a device for switching inductive loads, having a guard circuit for protecting against mispolarization of a voltage source.

Referring now to the figures of the drawings in detail and first, particularly, to FIG. 1 thereof, there is seen a device which includes a series circuit of an inductive load L1 and an electronic switch Q1 for triggering the load, through a further non-illustrated circuit that is connected to poles "+" and "−" of a voltage source Bat (a motor vehicle battery). The load current circuit is shown in heavy lines. A free-running diode D1 is connected parallel to the load L1.

Figure 2:
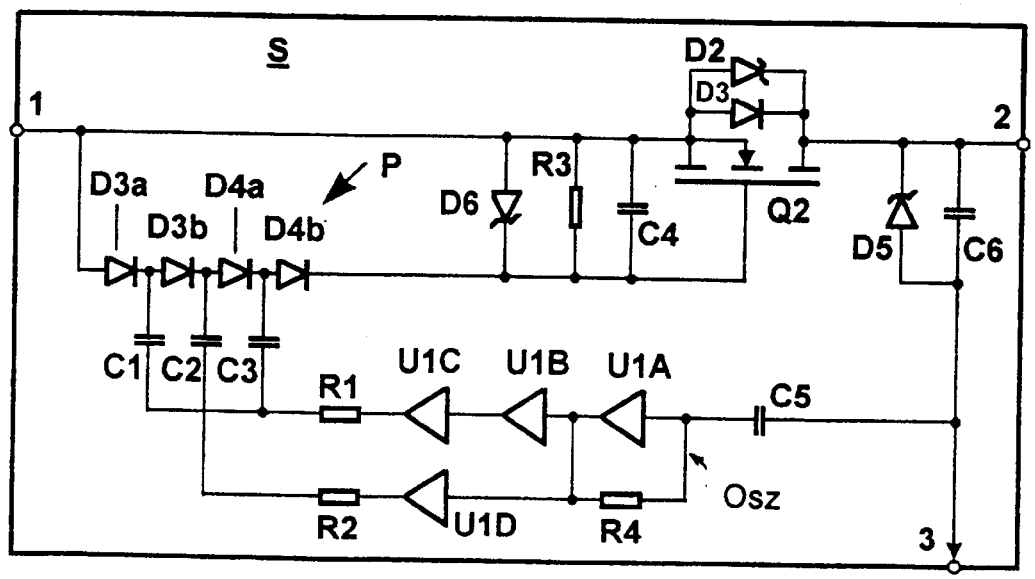
FIG. 2 is a schematic circuit diagram of the guard circuit.

According to the invention, a guard circuit S which is shown as a box and is used to protect against mispolarization of the voltage source, is inserted in a series circuit with the free-running diode D1. In this exemplary embodiment, the guard circuit S is inserted between the free-running diode D1 and a junction A, which is disposed between the positive pole +and the load L1. The circuit diagram of this guard circuit is shown in FIG. 2.

The guard circuit S has an inverse-driven N-channel MOSFET (source terminal at positive potential in normal, non-mispolarized operation) acting as an electronic switch Q2. The electronic switch Q2 is connected along a connecting line in a series circuit with the free-running diode D1, between the input 1 connected to the junction A and the output 2 connected to the cathode of the free-running diode D1. This inverse circuit has no significance to the switching behavior of the switch Q2. Terminal 3 is connected to the negative pole of the voltage source Bat.

The switch Q2 could intrinsically be constructed as a p-channel MOSFET instead, but this would involve substantially higher costs and a complex trigger circuit, for a comparable channel resistance.

If the voltage source Bat is correctly polarized, a charge pump P generates a positive gate-to-source voltage, which makes the switch Q2 conducting, and as a result the free-running current can flow unhindered.

In the event of mispolarization of the voltage source Bat, no positive gate-to-source voltage is generated, and the switch Q2 is nonconducting, so that the mispolarization protection is effective.

Since the circuit of a charge pump and an oscillator is known per se, this need not be described in further detail herein and a basic description will suffice.

In this exemplary embodiment, the charge pump P has three stages, including capacitors C1, C2, C3 and diodes D3$a$, D3$b$ and D4$a$, D4$b$. Triggering the charge pump P is effected through a Schmitt trigger oscillator Osz, which is made up of an inverter U1A, a capacitor C5 and a resistor R4, at a frequency of 100 kHz, for instance. Downstream inverters U1B, U1C and U1D are used for push-pull generation and for decoupling.

The voltage supply of the oscillator Osz is accomplished from the voltage source Bat through a non-illustrated ignition switch by using a mispolarization-protected, integrated voltage regulator (of 5 V, for instance), that is present in an engine controller ST.

A Zener diode D6 which carries current toward the gate terminal, a resistor R3 and a capacitor C4 are connected between source and gate terminals of the switch Q2:

in the event of a malfunction, the Zener diode D6 limits the gate voltage to a value allowable for the switch Q2;

the three-stage charge pump generates an idling voltage of approximately 15 V; with the loading by the resistor R3, the result is a typical value of 12 V, which is entirely sufficient to switch the switch Q2 completely;

the capacitor C4 acts as a storage element, and its capacitance should be selected to be high as compared to the capacitors C1–C3, so that the alternating voltage components of the charge pump are sufficiently filtered out; furthermore, if the voltage source is mispolarized, the gate-to-source voltage at the switch Q2 that occurs through the capacitive voltage divider C4/C1+C2+C3 remains reliably below the making threshold of the switch;

the resistor R3 discharges the capacitor C4 after the engine controller is turned off, and as a result the switch Q2 is reliably made nonconducting, until the next time the engine is started (or the next time the voltage source Bat possibly becomes mispolarized).

Outputs of the inverters U1C and U1D are each connected to a respective resistor R1, R2, which limits the charge currents of the capacitors C1, C2 and C3 and the output currents of the inverters U1C and U1D to tolerable values, in the event of rapid interference pulses.

The switch Q2, which is constructed as an n-channel MOSFET, also has a substrate diode D3, which enters the blocking state if the voltage source Bat becomes mispolarized. Since the supply voltage for the oscillator Osz is also lacking if the voltage source Bat is mispolarized, the charge pump is not activated. No positive gate-to-source voltage builds up, and the switch Q2 does not become conducting.

A pulse-proof limiter substance diode D2 is connected parallel to the substrate diode of the switch Q2 and a pulse-proof limiter diode D5is connected from the negative pole of the (correctly polarized) voltage source Bat to the drain terminal of the switch Q2. The limiter diodes D2 and D5 serve to limit the voltage of positive and negative interference pulses.

One of these diodes is operated in the flow direction and the other in the Zener direction. A screen capacitor C6 is connected between the drain terminal of the switch Q2 and the negative pole of the (correctly polarized) voltage source Bat, through terminal 3, or in other words parallel to the limiter diode D5.

The guard circuit described herein is inexpensive, reliable and not subject to any wear. A plurality of free-running circuits can be protected simultaneously and jointly against mispolarization with one guard circuit.

In a preferred exemplary embodiment of the invention, components dimensioned as follows are used:

| | |
|---|---|
| C1, C2, C3 = 2.2 nF | D2 = RD16EB |
| C4 = 100 nF | D3a, D3b = BAV99 |
| C5 = 1 nF | D4a, D4b = BAV99 |
| C6 = 3.3 µF | D5 = RD33EB |
| R1, R2 = 1 kΩ | D6 = RD18EB |
| R3 = 1MΩ | U1A–U1D = 74HC14 |
| R4 = 10 kΩ | Q2 = BUZ70/SIE |

I claim:

1. A device for switching inductive loads, comprising:

a voltage source having a positive pole, a negative pole and a polarization;

a series circuit connected between the positive and negative poles of said voltage source, said series circuit including a load and a load switch associated with said load;

a free-running diode connected to said load; and a guard circuit guarding against mispolarization of said voltage source, said guard circuit having an oscillator, a charge pump, and an electronic switch connected in a series circuit with said free-running diode, said electronic switch made conducting through said charge pump triggered by said oscillator, if the polarization of said voltage source is correct.

2. The device according to claim 1, wherein said electronic switch is an inverse-driven n-channel MOSFET having a source terminal connected to the positive pole of said voltage source.

3. The device according to claim 2, wherein said electronic switch has a gate terminal, and said charge pump is connected between the source and gate terminals of said electronic switch.

4. The device according to claim 2, including a voltage supply of said oscillator effected through said electronic switch from said voltage source by a mispolarization-protected, integrated voltage regulator.

5. The device according to claim 2, including:

a pulse-proof limiter diode connected parallel to said electronic switch;

a connecting line connected from said electronic switch to said free-running diode; and a further pulse-proof limiter diode connected between said connecting line and the negative pole of said voltage source;

said free-running diode and said limiter diodes having cathodes connected to one another.

* * * * *